Nov. 8, 1927.

C. F. JAEGER 1,648,128

MOTOR VEHICLE ATTACHMENT

Filed July 7, 1925

INVENTOR.
Charles F. Jaeger
BY
ATTORNEYS

Nov. 8, 1927.  
C. F. JAEGER  
1,648,128  
MOTOR VEHICLE ATTACHMENT  
Filed July 7, 1925  
2 Sheets-Sheet 2
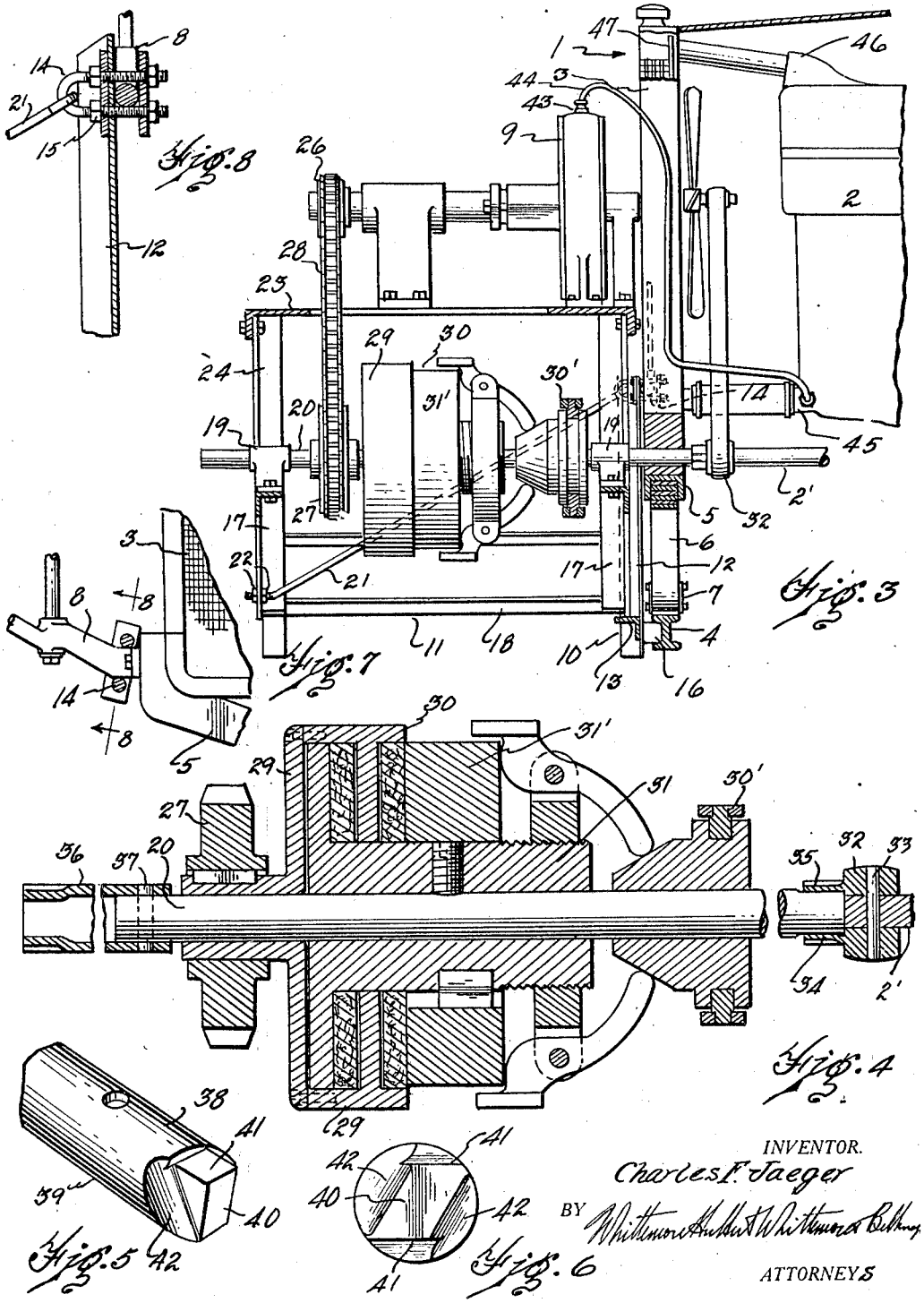
INVENTOR.  
Charles F. Jaeger  
BY  
ATTORNEYS Patented Nov. 8, 1927.

1,648,128

UNITED STATES PATENT OFFICE.

CHARLES F. JAEGER, OF DETROIT, MICHIGAN, ASSIGNOR, BY DIRECT AND MESNE ASSIGNMENTS, TO JAEGER PORTABLE POWER CORPORATION, OF DETROIT, MICHIGAN, A CORPORATION OF MICHIGAN.

MOTOR-VEHICLE ATTACHMENT.

Application filed July 7, 1925. Serial No. 42,007.

The invention relates to motor vehicle attachments and refers more particularly to attachments for a standard type of motor vehicle by means of which a machine tool may be carried by the motor vehicle and driven by its power plant. One of the objects of the invention is to provide a frame for the machine tool which may be readily and quickly applied to the motor vehicle or detached therefrom. Another object is to provide a frame which may be carried at the front of the motor vehicle and which will not interfere with the functioning of the spring between the frame of the motor vehicle and the front axle. Further objects are to provide a frame formed of cooperating detachable units; to provide a common means for carrying both units of the frame; to provide an improved driving connection between the crank shaft of the motor vehicle power plant and the power shaft of the attachment, which connection is so arranged that it may be operatively connected to a crank, when the attachment is removed, to start the power plant. With these as well as other objects in view the invention resides in the novel features of construction and combinations and arrangements of parts as more fully hereinafter set forth.

In the drawings:—

Figure 3 is a vertical central section through Figure 1;

Figure 4 is an enlarged cross section on the axis of the power shaft of the attachment;

Figures 5 and 6 are respectively a perspective view and an end view of the starting crank;

Figure 7 is an enlarged front end view of a portion of the attachment;

Figure 8 is a cross section on the line 8—8 of Fig. 7.

Figure 1:
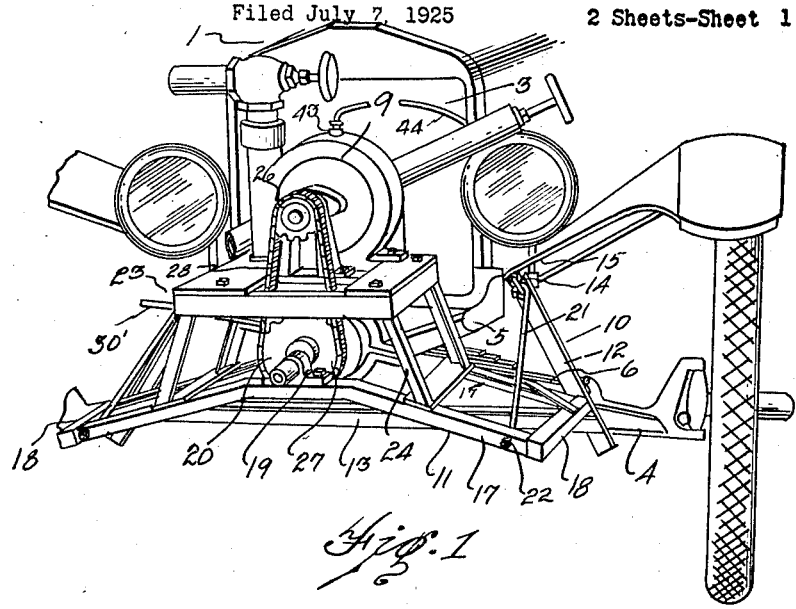
Figure 1 is a perspective view of a motor vehicle with an attachment applied thereto embodying my invention.
Figure 2:
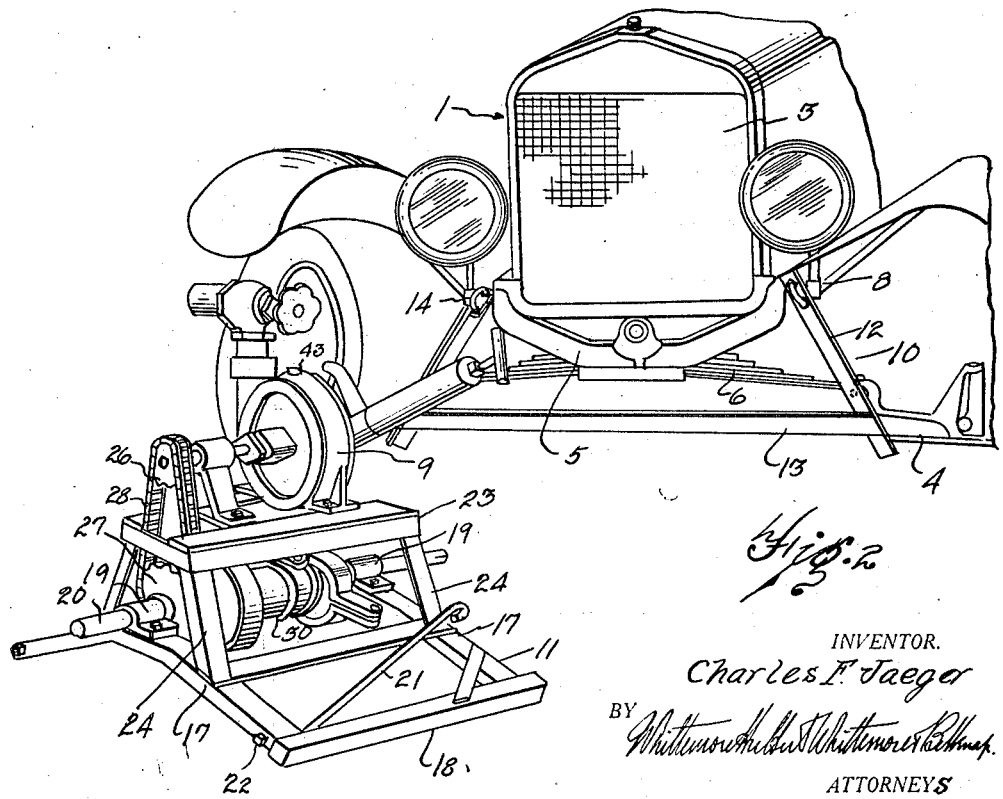
Figure 2 is a similar view with the units of the attachment frame disconnected.

1 is a motor vehicle of standard make having the internal combustion engine 2 for its power plant, the radiator 3, the front axle 4, the transverse front frame member 5 and the transverse spring 6 secured at its middle to the front frame member 5 and at its ends to the front axle by suitable means such as the shackles 7. The motor vehicle also has as part of its standard construction the transverse outwardly extending brackets 8 which have arms for supporting the front fenders and the head lights.

In the present instance my attachment carries a centrifugal pump 9, the impeller of which is adapted to be operatively connected to the power plant 2. The frame of my attachment comprises the cooperating units 10 and 11. The unit 10 is formed of the upright bars 12 and the horizontal bar 13, which latter is rigidly secured to the upright bars near their lower ends. This frame unit is supported upon the motor vehicle from the fender and lamp brackets 8 by means of the U bolts 14 which have their legs extending rearwardly through the upper ends of the upright bars 12 and above and below the brackets, each U bolt being clamped thereto by suitable means such as a transverse plate through which the bolt legs pass and nuts threaded upon the legs and securing the plate against the bracket. Other nuts 15 are also threaded upon the legs of the U bolts and at the front of the upright bars, so that the U bolts form eyes in front of the bars for a purpose to be more fully set forth. The frame unit 10 it will be seen is thus suspended from the ventilator and lamp brackets of the motor vehicle so that the lower portions of its upright bars would normally rest against the front axle. To avoid this I have provided the wear blocks 16 which are secured in the front channel of the front axle in position to be engaged by the upright bars.

The frame unit 11 is formed of the front and rear bridge bars 17 which are upwardly bowed from their ends toward their middles and the sill bars 18 which are rigidly secured to the ends of the bridge bars and which have portions extending rearwardly beyond the rear bridge bar to rest upon the horizontal bar 13 of the frame unit 10 adjacent to the upright bars 12 of this frame unit. The bars of the two frame units as thus far described are preferably angle bars. Mounted upon and secured to the middles of the bridge bars 17 are the bearings 19 in which is journalled the power shaft 20, the arrangement being such that this power shaft is in alignment with the crank shaft 2' of the power plant 2 when the frame unit is supported upon the motor vehicle.

For securing the frame unit 11 to the motor vehicle I have provided the tie bars 21 which are secured to the front bridge bar 17 of this frame unit and extend upwardly and rearwardly and are secured to the U bolts 14. The upper rear ends of these tie bars are hooked to engage in the eyes formed by the U bolts in front of the upright bar 12 of the frame unit 10 and the front ends of the tie bars are threaded and extend through the depending flange of the front bridge bar and are engaged by the nuts 22 which are adapted to be adjusted along the tie bars and be clamped against the opposite sides of the flange of this bridge bar. Thus when the rear end of the sill bars 18 are resting upon the horizontal bar 13 and the tie bars are tensioned the frame unit 11 will be securely carried upon the motor vehicle without danger of becoming detached. At the same time it will be seen that neither this frame unit nor the frame unit 10 interfere with the proper functioning of the transverse front spring of the motor vehicle.

For the purpose of providing for a high rate of rotation of the centrifugal pump impeller with a normal speed of the power plant, I have mounted the centrifugal pump so that its impeller shaft may be driven from the pump shaft at a higher rate of speed. In detail, the centrifugal pump is mounted upon the upper frame 23 which has the legs 24 preferably formed of angle iron supported upon the bridge bars 17 intermediate their ends and middles. The driving connection between the impeller shaft 25 and the power shaft 20 in the present instance consists of the sprockets 26 and 27, respectively, upon the impeller shaft and the power shaft and the sprocket chain 28. The sprocket 26 is fixed upon the impeller shaft, while the sprocket 27 is in the present instance fixed upon the driven member 29 of the friction clutch 30, which is journaled upon the power shaft. The driving member 31 of the clutch is fixed upon the power shaft and is arranged to frictionally engage the driven member through the movement of the cooperating member 31' when normally adjusted by means of the hand lever 30'. With this arrangement the friction clutch may be gradually thrown into operation thereby gradually picking up the load.

To provide for operatively connecting the power shaft 20 to the crank shaft 2' of the power plant 2, I remove the standard fan pulley from the crank shaft and replace the same by the fan pulley 32, which is secured to the crank shaft in the same manner by means of a transverse pin 33. This pulley has the reduced hollow front end portion 34, the sides of which are preferably offset inwardly at 35 to provide an opening having opposite flat sides connected by round sides. The rear end of the power shaft 20 is flattened on its opposite sides to fit in this opening and to be rotated by the pulley. The front end of the power shaft 20 has the sleeve 36 secured thereto by suitable means such as the transverse pin 37, this sleeve being formed in the same manner as the hollow reduced front end portion of the pulley 32 to form a correspondingly shaped opening which is engageable in by the end portion 38 of the starting crank 39. For the purpose of starting the power plant and automatically disengaging the starting crank upon running of the power plant the end portion 38 has the wedge shaped portion 40 forming the inwardly offset parallel shoulders 41 for driving engagement with the flat sides of either the hollow reduced front end portion of the pulley 32 or the sleeve 36. This end portion 38 also has the inclined shoulders 42 at its sides intermediate the shoulders 41 and engageable with the outer ends of the flat sides of either the front end portion of the pulley or the sleeve so that upon faster rate of rotation thereof than the starting crank, the latter is automatically disengaged.

With this arrangement it will be seen that the same starting crank is engageable in the sleeve upon the front section of the power shaft or in the pulley upon the crank shaft, when my attachment is removed, to start the power plant of the motor vehicle.

For the purpose of preventing overheating of the internal combustion engine 2, I make use of the centrifugal pump 9. In detail, the casing of this pump is provided at its top with the nipple 43 from which I lead the flexible conduit 44 to the water intake nipple 45 of the engine, this nipple being connected in the usual manner to the lower end of the radiator 3. With this construction, when the centrifugal pump is pumping water a small portion of this water is discharged through the nipple 43 of the pump casing, the flexible conduit 44 and the intake nipple 45 of the engine into the water jacket of the engine and then passes through this water jacket, finally discharging through the discharge nipple 46 of the engine and into the radiator 3, after which it flows through the overflow pipe 47 for the radiator, this overflow pipe being part of the standard radiator construction. Thus it will be seen that the centrifugal pump has the additional function of assisting in preventing the engine from overheating by forcing cooling water through the water jacket of the engine.

What I claim as my invention is:

1. In a motor vehicle attachment, the combination with a frame unit positioned in advance of a motor vehicle, a power shaft journaled upon said frame unit, means for operatively connecting the power shaft to the crank shaft of the motor vehicle power plant, and means for supporting said frame unit upon the motor vehicle, including a member depending from a part of the motor vehicle rigid with the bearings of the crank shaft and extending in advance of the front axle of the motor vehicle and supporting the rear end of said frame unit, and a tie bar extending from the front end of said frame unit and extending upwardly and rearwardly to a part of the motor vehicle rigid with the bearings of the crank shaft.

2. In a motor vehicle attachment, the combination of a frame comprising cooperating frame units, one of said units depending from a part of the motor vehicle rigid with its frame and the other of said frame units being supported at one end upon said first mentioned frame unit and at the other end from a part of the motor vehicle rigid with its frame, a power shaft journaled upon said last mentioned frame unit, and means for operatively connecting said power shaft to the crank shaft of the motor vehicle power plant.

3. In a motor vehicle attachment, the combination with a frame unit in advance of a motor vehicle and comprising sill bars and upwardly bowed bridge bars extending between said sill bars, an upper frame mounted upon said bridge bars, a shaft carried upon said upper frame, a power shaft journaled upon said bridge bars, means for operatively connecting said shafts to each other, means for operatively connecting said power shaft to the crank shaft of the motor vehicle power plant, and means for detachably securing said frame unit to a part of the motor vehicle rigid with the bearings of the crank shaft.

4. The combination with a motor vehicle, of an attachment therefor including a frame unit having upright bars and a substantially horizontal bar, bolts connecting said upright bars to fixed parts of the vehicle, and a cooperating frame unit having bars resting on said horizontal bar and having tie rods connected to the bolts aforesaid.

5. The combination with a motor vehicle having a crank shaft, of an attachment therefor including a frame unit in advance of the motor vehicle, a power shaft journaled in bearings fixed upon said frame unit, means for operatively connecting said power shaft to the crank shaft, a second frame unit resting against the front axle of the motor vehicle and provided with means for supporting the first mentioned frame unit, and an impeller shaft located above said power shaft and operatively connected thereto.

6. The combination with a motor vehicle, of an attachment therefor including a frame unit having upright bars suspended from fixed parts of the vehicle and a substantially horizontal bar connected to said upright bars, and a second frame unit having the forward end thereof suspended from the fixed parts aforesaid of the vehicle and having rearward extensions resting on the horizontal bar of the first unit.

7. The combination with a motor vehicle, of an attachment therefor including a frame having upright bars rigidly secured to the vehicle and a horizontal bar connected to said upright bars in advance of the front axle of the vehicle, wear plates between said horizontal bar and axle, and a frame unit connected to the vehicle having parts resting on the horizontal bar and normally urging said wear plates in engagement with the front axle.

8. The combination with a motor vehicle having a crank shaft, of an attachment therefor including a frame unit having upright bars and a substantially horizontal bar secured to the upright bar, a second frame unit resting on said horizontal bar, a shaft in alignment with and driven by said crank shaft and journaled in said last mentioned frame, a pump secured to the top of said second frame unit having a shaft, and a driving connection between said driven shaft and pump shaft.

9. The combination with a motor vehicle having a crank shaft, of a pump attachment therefor including a frame unit in advance of the vehicle having a substantially horizontal bar resting against the front axle thereof, a box frame having rearwardly extending portions resting on the horizontal bar aforesaid, a pump mounted on the top of said box frame, and an operating connection between said pump and crank shaft including a shaft driven from the crank shaft located within said box frame.

In testimony whereof I affix my signature.

CHARLES F. JAEGER.